(12) United States Patent
Alcocer Ochoa et al.

(10) Patent No.: US 9,294,140 B2
(45) Date of Patent: Mar. 22, 2016

(54) RADIO FREQUENCY INTERFERENCE MITIGATION

(71) Applicant: INTEL CORPORATION, Santa Clara, CA (US)

(72) Inventors: Alberto Alcocer Ochoa, Zapopan (MX); Hector A. Cordourier Maruri, Guadalajara (MX); Maynard C. Falconer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/728,689

(22) Filed: Dec. 27, 2012

(65) Prior Publication Data

US 2014/0187187 A1   Jul. 3, 2014

(51) Int. Cl.
| | | |
|---|---|---|
| *H04B 1/00* | (2006.01) | |
| *H04B 15/00* | (2006.01) | |
| *H04B 1/10* | (2006.01) | |
| *H04B 1/12* | (2006.01) | |
| *H04B 7/06* | (2006.01) | |
| *H01Q 3/26* | (2006.01) | |

(52) U.S. Cl.
CPC ............... *H04B 1/12* (2013.01); *H01Q 3/2611* (2013.01); *H04B 7/0617* (2013.01)

(58) Field of Classification Search
CPC .......................... H04B 1/0483; H04B 1/0475
USPC ........ 455/114.2, 278.1, 279.1, 272, 273, 275, 455/276.1, 296, 298, 310, 63.1, 63.4; 370/702
See application file for complete search history.

(56) References Cited

U.S. PATENT DOCUMENTS

| | | | |
|---|---|---|---|
| 5,630,224 A * | 5/1997 | Swail | 455/296 |
| 8,159,399 B2 * | 4/2012 | Dorsey et al. | 343/702 |
| 2006/0262764 A1 * | 11/2006 | Peleg et al. | 370/338 |
| 2008/0068271 A1 * | 3/2008 | Iwai et al. | 343/702 |
| 2008/0150812 A1 * | 6/2008 | Kanazawa et al. | 343/702 |
| 2010/0197261 A1 * | 8/2010 | Zibrik et al. | 455/232.1 |

* cited by examiner

*Primary Examiner* — Nguyen Vo
(74) *Attorney, Agent, or Firm* — International IP Law Group, P.L.L.C.

(57) ABSTRACT

A computing device including a wireless communication system is provided herein. The computing device includes a plurality of antennas coupled to the wireless communication system. The computing device also includes a pattern controller to shape an antenna pattern of the plurality of antennas to point a null of the antenna pattern toward a Radio Frequency Interference (RFI) source of the computing device.

17 Claims, 7 Drawing Sheets

RADIO FREQUENCY INTERFERENCE MITIGATION

TECHNICAL FIELD

The present disclosure relates to the techniques for reducing Radio Frequency Interference (RFI). More specifically, the present disclosure relates to reduction of RFI in computing devices through spatial filtering.

BACKGROUND ART

Modern computing devices, such as laptops, tablet PC, smart phones, and the like, often include a variety of wireless communication systems that enable to the device to communicate wirelessly with other devices and communication networks. Radio Frequency Interference (RFI) coming, for example, from clock signals, high speed data buses, and chipsets in the device, can couple to the radio antennas that serve the wireless communication systems included in the device. The coupling of RFI into these systems reduces the communication system performance and degrades the user experience. Ignoring RFI coming from the platform may delay the product release because of certifications or add serious problems to the platform performance.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Embodiments of the present techniques use antenna array techniques to spatially filter out the RFI power coupled to the antennas of a computing device, thereby increasing the Signal to Interference plus Noise Ratio (SINR). The electronic device will include a number of antennas and a number of RFI sources. In some embodiments, the relative locations of the antennas and the RFI sources will be known or can be determined during operation of the electronic device. The interference signals coming from the RFI sources can be spatially filtered by shaping the antenna pattern created by the antennas such that nulls in the antenna pattern can be pointed toward the RFI sources.

Figure 1:
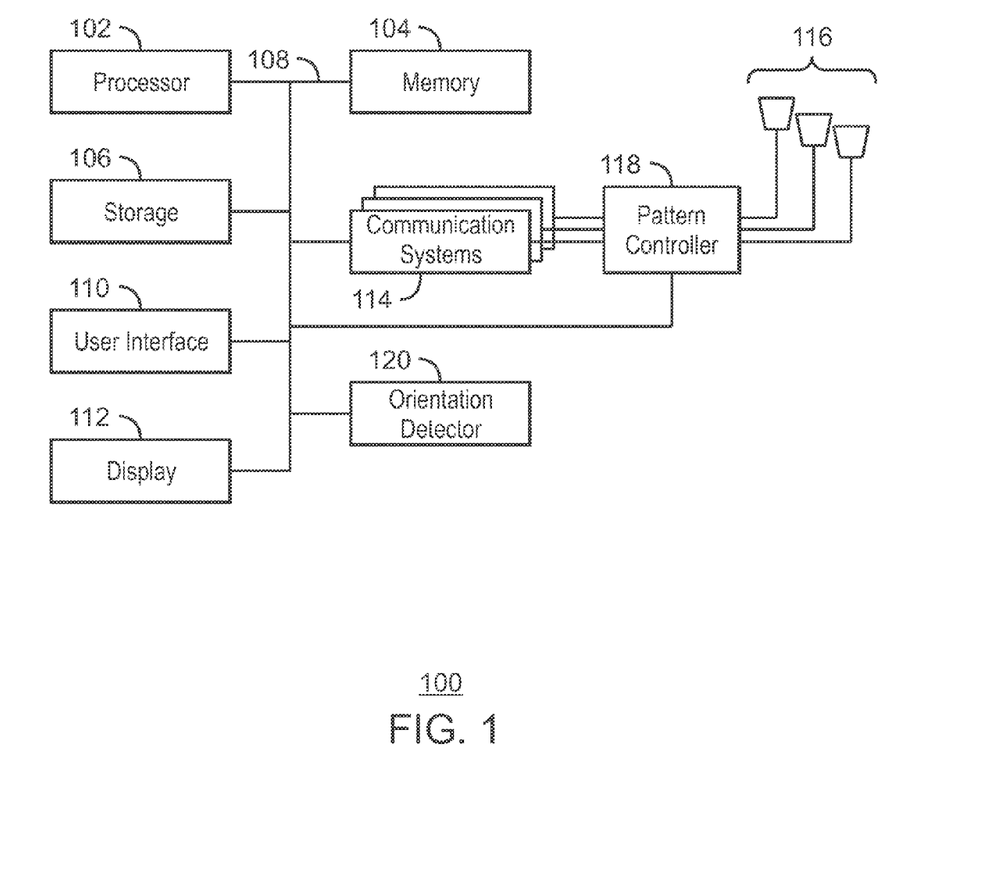
FIG. 1 is a block diagram of a computing device 100 in accordance with embodiments.

FIG. 1 is a block diagram of a computing device 100 in accordance with embodiments. The computing device 100 may be any type of computing device that includes wireless communication systems. For example, the computing device 100 may be a mobile phone, a laptop computer, or a tablet PC, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 may include random access memory (RAM), read only memory (ROM), flash memory, or any other suitable memory systems. The computing device 100 can also include a storage device 106, for the long term storage of data and applications.

The processor 102 may be connected through a bus 108 to one or more user interface devices 110. The user interface devices 110 may include, for example, a keyboard and a pointing device, wherein the pointing device may include a touchpad or a touchscreen, among others. The user interface devices 110 may be built-in components of the computing device 100, or may be devices that are externally connected to the computing device 100.

The processor 102 may also be linked through the bus 108 to a display device 112, wherein the display device 112 may include a display screen that is a built-in component of the computing device 100. The display device 112 may also include a computer monitor, television, or projector, among others, that is externally connected to the computing device 100.

The computing device 100 can also include a number of wireless communication systems 114. For example, the wireless communication systems may include a WiFi system, a Global Position System (GPS), a Bluetooth system, and a mobile telecommunications system, such as 3G, 4G, 5G, or any other mobile telecommunication system currently available or to be developed in the future. The computing device 100 also includes a number of antennas 116 coupled to the wireless communication systems 114. In a typical configuration, each of the communication systems 114 would be separately coupled to its own antenna or set of antennas and each antenna would be dedicated to its corresponding communication system. In accordance with embodiments described herein, the antennas 116 are configured as an antenna array configured to serve some or all the communication systems 114. In some embodiments, the antennas can be included in a single integrated circuit chip.

The computing system 100 also includes a pattern controller 118 that controls the antenna pattern of the antenna array. The pattern controller 118 generates an antenna pattern that increases the SINR experienced by the communication systems 114 by creating nulls in the antenna pattern which are directed toward the RFI sources in the computing device 100. In this way, the RFI generated by the computing device is spatially filtered.

In some embodiments, the computing device 100 may include a single enclosure, such that the location of the RFI sources relative to the antennas is fixed. In some embodiments, the enclosure of the computing device 100 may have members that are capable of being rotated or pivoted in relation to one another, such as a laptop computer with a based and a lid or a "flip-style" mobile phone, also referred to as a clamshell phone. Thus, the location of the RFI sources may vary depending on the orientation of the members, such as whether the lid is open or closed. In some embodiments, the pattern controller 118 can adjust the antenna pattern based on a change in the relative location of the RFI sources with respect to the antennas. To enable the pattern controller 118 to determine the orientation of the device members, the computing device 100 can include an orientation detector 120. The orientation detector 120 detects the orientation of the device members and can report the orientation to the pattern controller, which adjusts the antenna pattern based on the orientation.

It is to be understood that the block diagram of FIG. 1 is not intended to indicate that the computing device 100 is to include all of the components shown in FIG. 1. Rather, the computing device 100 can include fewer or additional components not illustrated in FIG. 1. Furthermore, the components may be coupled to one another according to any suitable system architecture, including the system architecture shown in FIG. 1 or any other suitable system architecture that enables the antennas of the device to be configured together as an array.

Figure 2:
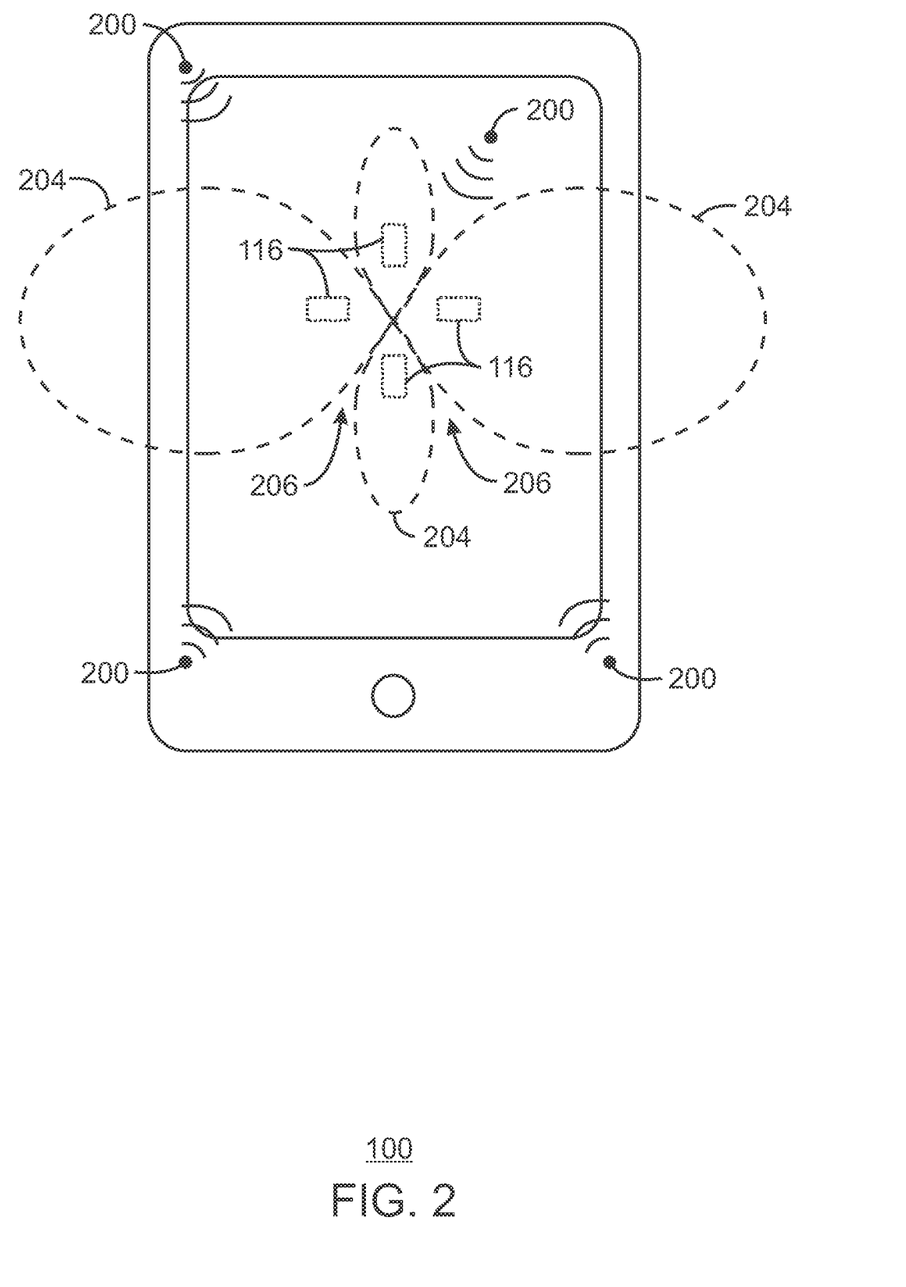
FIG. 2 is a top view of a computing device showing an antenna pattern of the computing device.

FIG. 2 is a top view of a computing device showing an antenna pattern of the computing device. The computing device 100 includes a number of antennas 116 and a number of RFI sources 200. As shown in FIG. 2, the computing device 100 includes a single unitary enclosure such that the antennas and the RFI sources are at fixed locations relative to one another. The antennas 116 may be at any suitable location within the computing device 100 and may be fully enclosed within the enclosure or may be partly exposed at a surface of the enclosure. The RFI sources 200 may located at any location within the computing device 100, depending on the architecture of the computing device 100.

The antenna pattern 202 represents the relative signal strength of the radio waves received by the antenna array as a function of the angular direction about the antenna array. As described further below in relation to FIG. 3, the antenna pattern 202 can be controlled by controlling the relative amplitude and phase of the signals received by each of the antennas. Furthermore, the antenna pattern 202 is only one example of an antenna pattern that can be generated in accordance with embodiments.

As shown in FIG. 2, the antenna pattern includes four lobes which represent the directions in which a received signal will have a relatively high signal strength. The antenna pattern also includes nulls 206, which represents directions in which the received signal will have a relatively low signal strength. As used herein, the term null is used to refer to an area of an antenna pattern that is between lobes. The nulls 206 are shown in FIG. 2 as approaching a value of zero, indicating very low received signal strength in the direction of the null. However, the antenna pattern can be controlled such that the nulls are at any suitable value. As shown in FIG. 2, the antenna pattern is controlled such that the nulls are pointed in the direction of the RFI sources 200. In this way, any signal received from the RFI sources 200 will be significantly diminished in amplitude, thus increasing the SINR experienced by the communication devices coupled to the antenna array. The location of the RFI sources 200 does not need to be known for the present techniques to provide significant reduction in SINR. Rather, increasing the gain of the antenna array will, in most cases, provide at least some increase in SINR.

Figure 3:
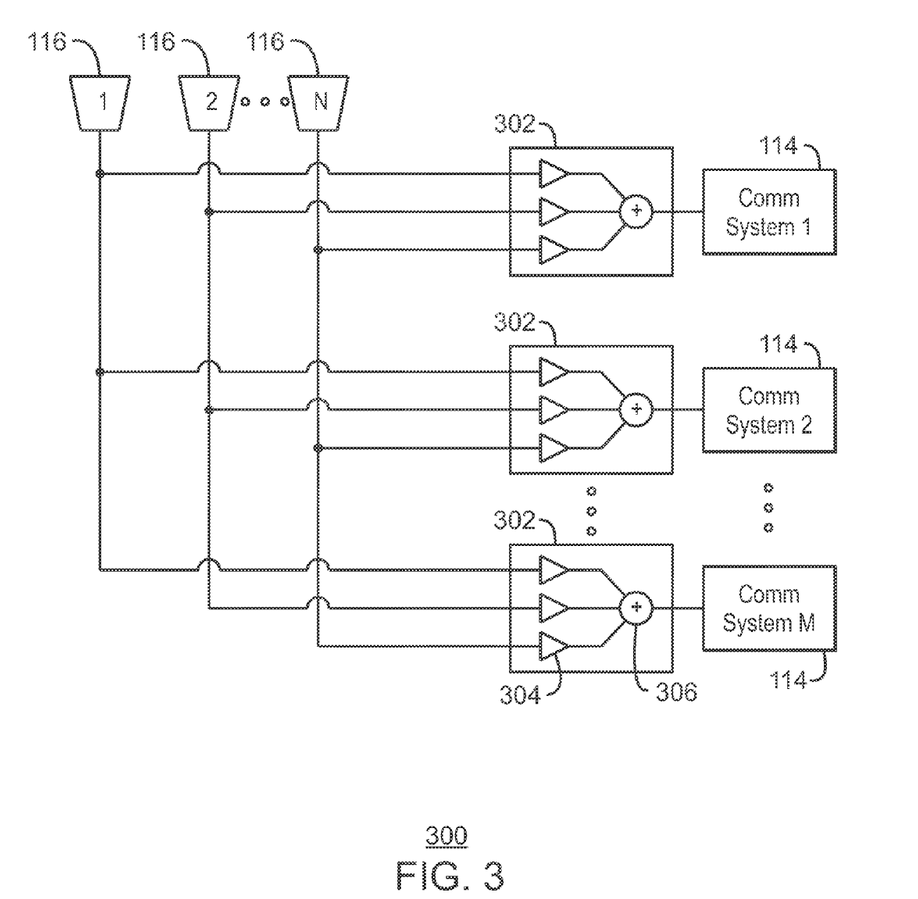
FIG. 3 is a block diagram of a system for generating an antenna pattern such as the antenna pattern shown in FIG. 2.

FIG. 3 is a block diagram of a system for generating an antenna pattern such as the antenna pattern shown in FIG. 2. The system 300 may be implemeted, for example, in the computing device of FIG. 1 or 2. The system 300 includes a number of antennas 116 labeled 1 through N and a number of communication systems 114 labeled 1-M. In some embodiments, the number of antennas 116 is equal to or greater than the number of communication systems 114. In some embodiments, each communication system 114 operates at a different frequency band. Each of the communication systems 114 is coupled to the antenna array through a corresponding spatial filter 302. Each spatial filter 302 may be coupled to each of the antennas 116 in the antenna array and includes a number of inputs equal to the number of antennas 116. The input of each spatial filter 302 may be coupled to an amplifier 304 that modifies the signal received from each antenna. For example, the amplifier 304 can apply a gain to the received signal. The gain applied to the input signal can be a complex gain, which means that the amplifier can apply an amplitude factor, a phase delay, or both to the received signal. Furthermore, the amplitude factor can be less than one, resulting in attenuation of the received signal or greater that one, resulting in amplification of the received signal. The modified signals may then be output to a summer 306. The summer 306 sums the signals and outputs the result to the respective communication system 114. In this way, the spatial filter 302 filters out received signals based on their location within the computing device relative to RFI sources.

The special filters 302 may be implemented in any suitable computer logic hardware, including analog circuits, digital circuits, or a combination thereof. Examples include Operational Amplifiers (OpAmps), Analog-to-Digital Converters (ADCs), Digital Signal Processers (DSPs), and one or more processors configured to execute non-transitory, computer-readable instructions, among others. In some embodiments, the amplification and summation operations performed by the spatial filter 302 can be implemented on the received analog signal using analog circuits. In some embodiments, the analog signal received from the antenna 116 can be converted to a digital signal and the amplification and summation operations can be performed mathematically on the digital data using a processor.

The gains applied to the antenna signals by the spatial filter 302 may be referred to herein as the pattern control parameters. Each pattern control parameter may be a complex gain corresponding to a particular one of the antenna signal inputs. The pattern control parameters can be obtained through testing during a validation stage of product development or the pattern control parameters can be determined during operation of the computing device. Furthermore, the pattern control parameters may be static values that do vary during operation of the computing device. As explained further below in relation to FIGS. 4A, 4B, and 5, the pattern control variables may also be varied during device operation to adapt the antenna pattern to changing conditions.

Figure 4A:
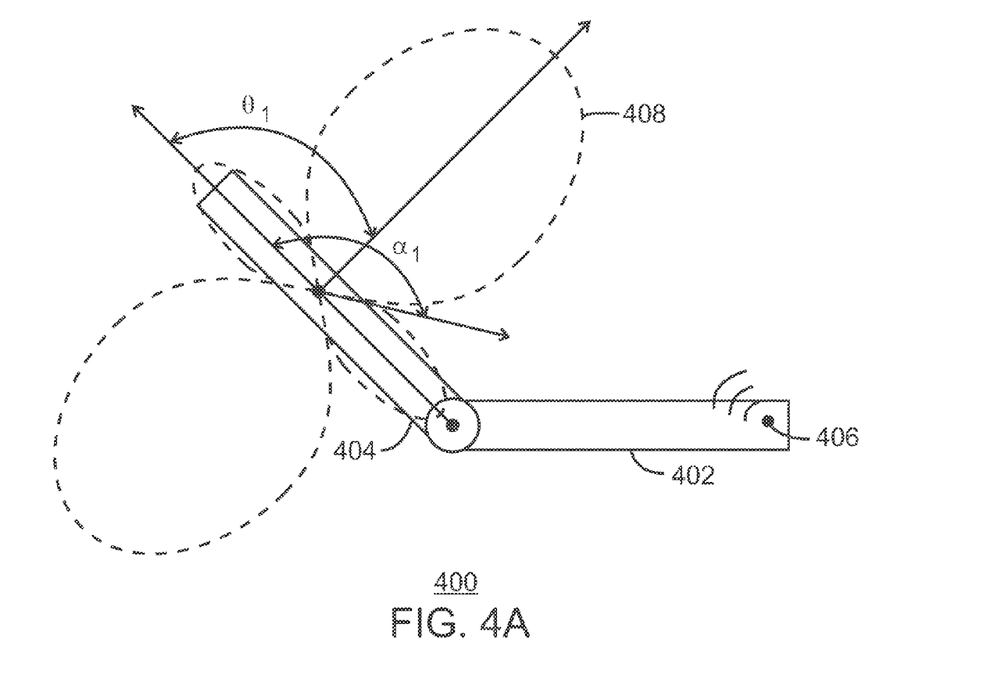
FIG. 4A is a side view of an electronic device with a clamshell form factor.

FIG. 4A is a side view of an electronic device with a clamshell form factor. For example, the electronic device 400 can be a laptop computer or a flip-style mobile phone. The electronic device 400 includes a first portion 402, such as a laptop base, and a second portion 404, such as a laptop lid, that is pivotable about the first portion 402. In the example of FIG. 4, the electronic device 400 includes a number of antennas (not shown) in the second portion 404 and at least one RIF source 406 in the first portion 402. In the example of FIG. 4, the relative location of the RIF source 406 and the antennas is not fixed. The antenna pattern 408 can be controlled based on the relative location of the RFI source 406 with respect to the antennas. For example, the antenna pattern 408 can be modified during operation of the electronic device 400 based on a change in a relative location of the RFI source 406 with respect to the plurality of antennas. As shown in FIG. 4A, the antenna pattern 408 is controlled to such that the main lobe of the antenna pattern is pointed away from the RFI source 406, as indicated by the beam angle, $\theta_1$, and a null in the antenna pattern 408 is pointed toward the RFI source 406 as indicated by the null angle, $\alpha_1$. Movement of the second portion 404 relative to the first portion 402 can be detected, for example, by the orientation detector 120 (FIG. 1). In response to the movement, the pattern controller 118 (FIG. 1) can adjust the antenna pattern 408 to keep the null pointed toward the RIF source 406.

Figure 4B:
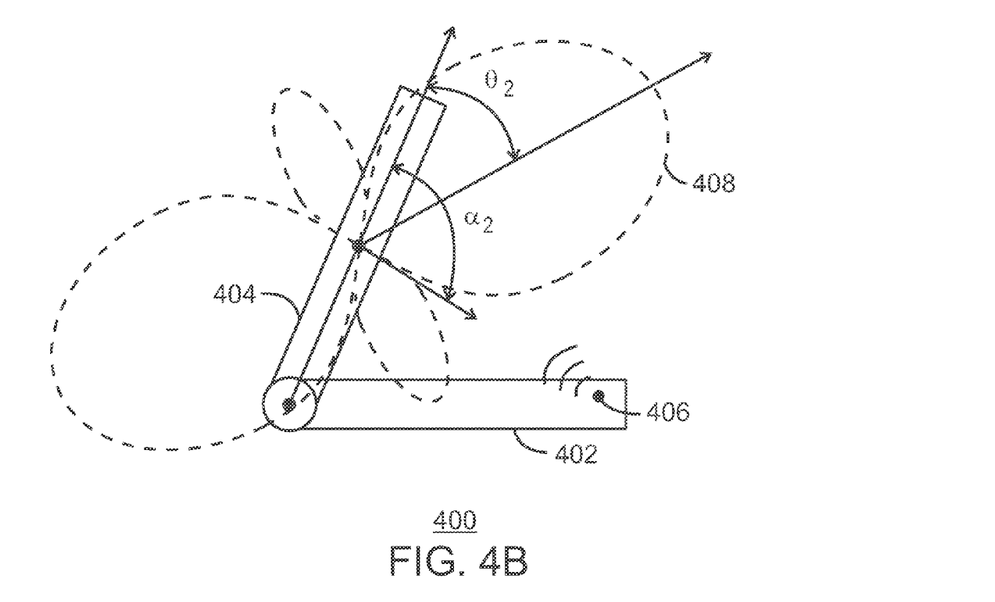
FIG. 4B is a side view of the electronic device of FIG. 4A wherein the second portion has been rotated about the first portion.

FIG. 4B is a side view of the electronic device of FIG. 4A wherein the second portion has been rotated about the first portion. FIG. 4B shows that the antenna pattern 408 has been changed based on the new position of the second portion 404. As shown in FIG. 4B, the beam angle of the main lobe has been changed to a new angle, $\theta_2$, with respect to the antenna array included in the second portion 404. Similarly, the angle of the null has been changed to a new angle, $\alpha_2$, with respect to the antenna array included in the second portion 404. The new angle of the null ensures that the null remains pointed toward the RIF source 406.

Figure 5:
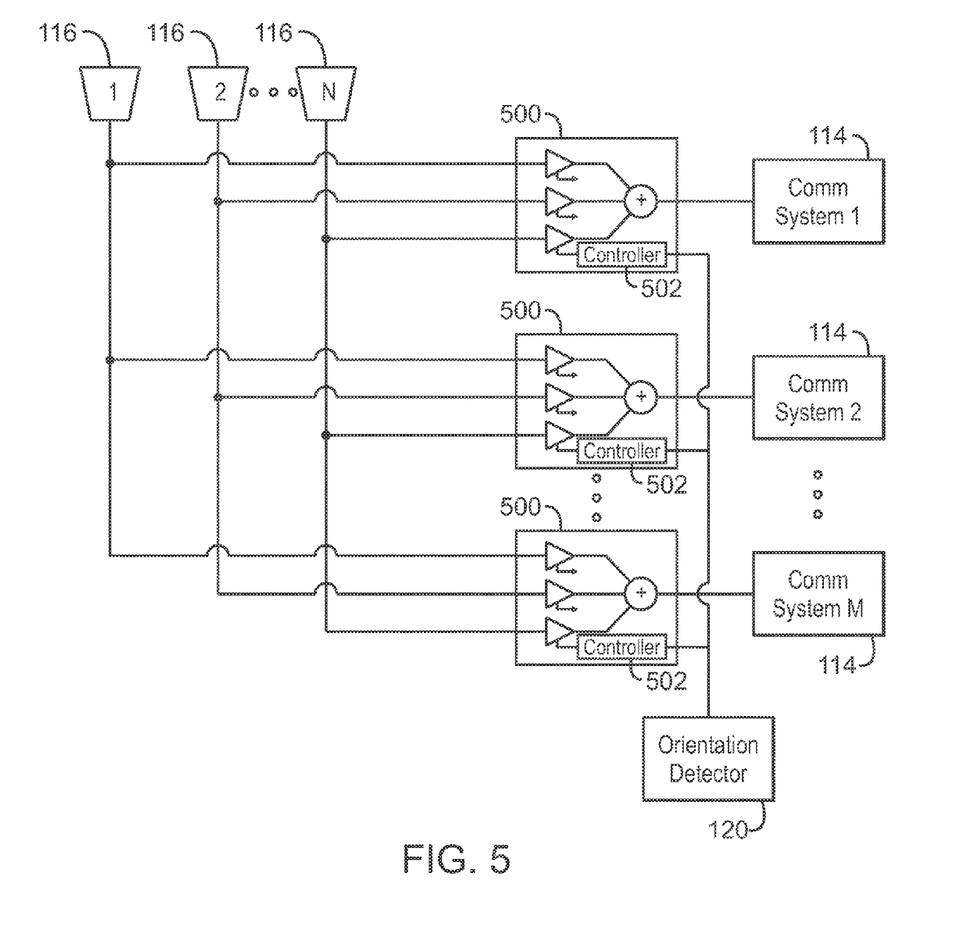
FIG. 5 is a block diagram of a system for generating an adjustable antenna pattern.

FIG. 5 is a block diagram of a system for generating an adjustable antenna pattern. The system 500 may be implemented, for example, in the computing device of FIG. 1 or 4. As in the system 300 of FIG. 3, the system 500 includes a number of antennas 116 labeled 1 through N and a number of communication systems 114 labeled 1-M. Each of the communication systems 114 is coupled to the antenna array through a corresponding spatial filter 500 that modifies and sums the signals received from the antennas 116.

The system 500 can also include the orientation detector 120, which is communicatively coupled to a controller 502 included in each of the spatial filters 500. The controller 502 receives orientation data from the orientation detector 120 and adjusts the pattern control parameters based on the orientation data. In some embodiments, the controller 502 may calculate the pattern control parameters based, in part, on the orientation data. In some embodiments, the controller 502 is coupled to a table of pattern control parameters that relate specific orientations of the members of the computing device 500 with corresponding pattern control parameters to be used for each orientation. In some embodiments, the table may include two sets of pattern control parameters, one corresponding to an open position, as shown in FIG. 4A, and one corresponding to a closed position of the computing device. The table may also include any suitable number of additional sets of control parameters for various orientations of the members between the open position and the closed position.

Figure 6:
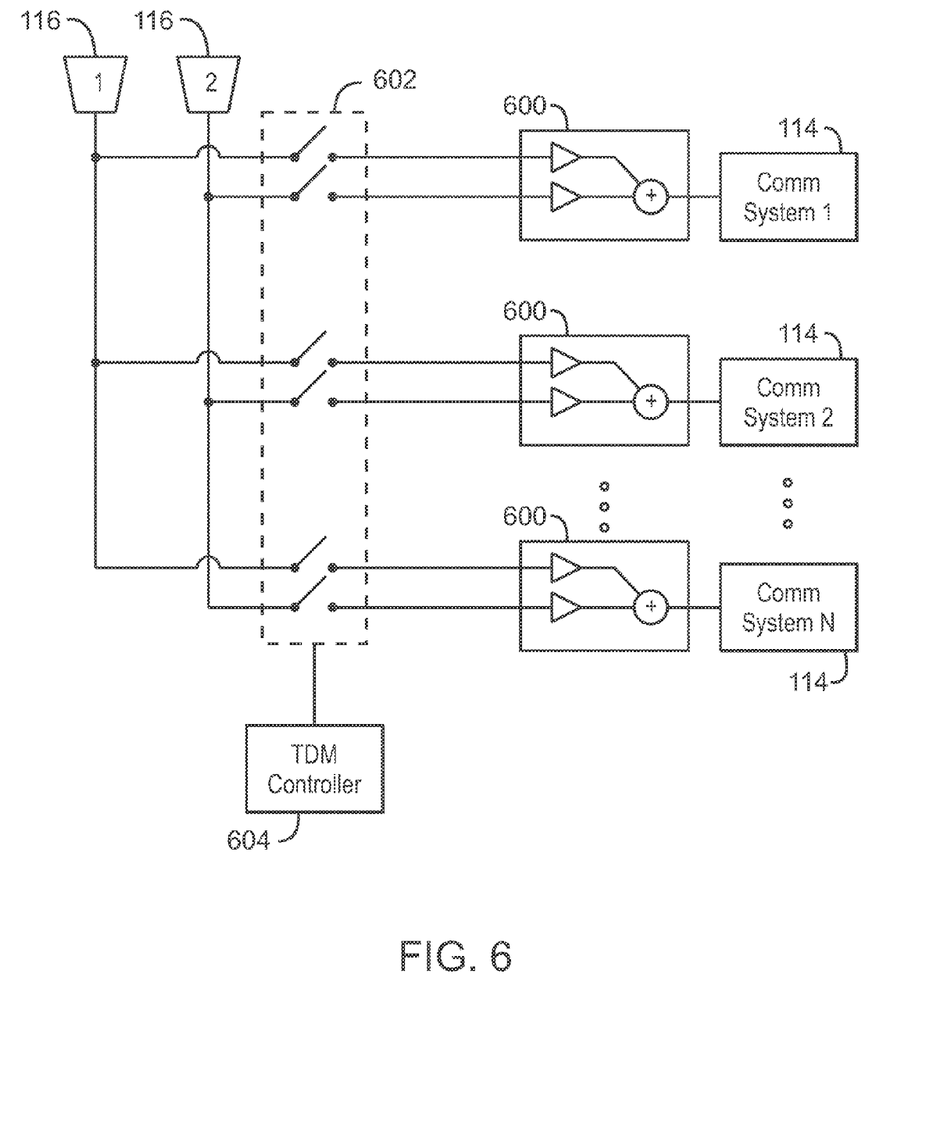
FIG. 6 is a block diagram of a system for generating an antenna pattern using two antennas coupled to three or more communication systems.

FIG. 6 is a block diagram of a system for generating an antenna pattern using two antennas coupled to three or more communication systems. As in systems 300 and 500 of FIGS. 3 and 5, the system 600 includes a number of antennas 116 labeled 1 and 2 and a number of communication systems 114 labeled 1-M. Each of the communication systems 114 is coupled to the antenna array through a corresponding spatial filter 600 that modifies and sums the signals received from the antennas 116. The system of FIG. 6 operates substantially as described in relation to systems 300 and 500. However, the system 600 of FIG. 6 includes only two antennas such that the number of antennas is less than the number of communication systems 114 coupled to the antenna array. It will be appreciated that the system 600 can include additional antennas not shown.

The communication systems 114 are coupled to the antenna array through the spatial filters 600. Furthermore, the communication systems 114 can operate at frequency ranges that are substantially the same or overlapping. To prevent interference between the communication systems 114, the system 600 may include a controller that enables the communication systems 114 to share the antenna array. For example, as show in FIG. 6, each of the spatial filters can be couple to the antennas through a set of switches 602. The system 600 can include a Time Domain Multiplexer (TDM) controller 604 coupled to set of switches 602. The TDM controller 604 can couple one communication system 114 to the antenna array at a time according to any suitable time sharing scheme. In some embodiments, the TDM controller 504 can determine whether one or more of the communication systems is inactive. For example, a Wifi or Bluetooth functionality of the computing device may be disabled by the user, in which case, the TDM controller 504 can implement a time sharing scheme that only involves active communication systems, and disables communication systems that are inactive.

It will be appreciated that the time division multiplexing circuitry shown in FIG. 6 is only one example of a time division multiplexing system that can be used in embodiments of the present techniques. For example, although the switches 602 are shown as being located between the antenna array and the spatial filters 600, the switches 603 can be located at any suitable location. For example, the switches 602 may be included in the spatial filters 600 or in each of the communication systems 114.

Figure 7:
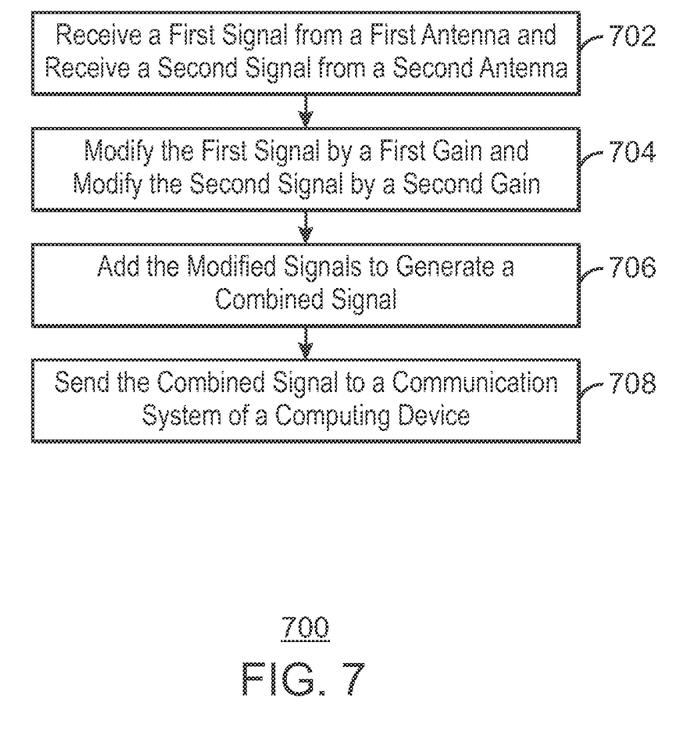
FIG. 7 is a process flow diagram showing an example of a method for spatially filtering RFI in a computing device.

FIG. 7 is a process flow diagram showing an example of a method for spatially filtering RFI in a computing device. The method 700 may be implemented, for example, in the computing device 100 of FIG. 1. The method 700 may be implemented in any suitable hardware, including logic circuits, one or more processors configured to execute computer-readable instructions, and the like. The method can begin at block 702 wherein a first signal is received from a first antenna and a second signal is received from a second antenna. Although the method is described in relation to two signals received by two antennas, it will be appreciated that the method can be scaled to include any suitable number of antennas.

At block 704, the first signal can be modified by a first gain and the second signal can be modified by a second gain. The first gain and the second gain may be collectively referred to as pattern control parameters. The first and second gains can be complex gains, in other words, including an amplitude factor component (amplification or attenuation), a phase delay component, or both. The first gain and the second gain are specified to shape a combined antenna pattern of the first and second antennas to point a null of the combined antenna pattern toward at least one RFI source in the computing device.

At block 706, the first modified signal and the second modified signal can be added together to generate a combined signal. By modifying the received signals according to the pattern control parameters, certain components of the signal can be cancelled when the signals are combined. For example, if the resulting antenna pattern includes a null pointed to an RFI source, the signals received by the antennas from the RFI source will be shifted out of phase such that the signals will cancel each other to some extent when added together.

At block 708, the combined signal is sent to a communication system. It will be appreciated that any number of additional actions may be included within the method 700, depending on the specific application. For example, the method 700 may be used in a computing device with any suitable number of antennas.

EXAMPLE 1

A computing device with a wireless communication system is described herein. The computing device includes a plurality of antennas coupled to the wireless communication system. The computing device also includes a pattern controller to shape an antenna pattern of the plurality of antennas to point a null of the antenna pattern toward a Radio Frequency Interference (RFI) source of the computing device.

EXAMPLE 2

A computing device is described herein. The computing device includes logic to receive a first signal from first antenna and modify the first signal according to a first gain to generate a first modified signal. The computing device also includes logic to receive a second signal from a second antenna and modify the second signal according to a second gain to generate a second modified signal. The computing device also includes logic to sum the first modified signal and the second modified signal to generate a combined signal and send the combined signal to a wireless communication system. The first gain and the second gain are specified to shape a combined antenna pattern of the first and second antennas to point a null of the combined antenna pattern toward a Radio Frequency Interference (RFI) source of the computing device.

EXAMPLE 3

An integrated circuit chip is described herein. The integrated circuit chip includes an antenna array comprising a plurality of antennas to couple to a plurality of communication systems. The integrated circuit chip also includes a pattern controller to shape an antenna pattern of the antenna array to point a null of the antenna pattern toward a Radio Frequency Interference (RFI) source of the computing device.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any non-transitory medium for storing or transmitting information in a form readable by a machine, e.g., a computer. For example, a machine-readable medium may include read only memory (ROM), random access memory (RAM), magnetic disk storage media, optical storage media, and flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

What is claimed is:

1. A computing device, comprising:
   a wireless communication system;
   a plurality of antennas coupled to the wireless communication system;
   a pattern controller to shape an antenna pattern of the plurality of antennas to point a null of the antenna pattern toward a Radio Frequency Interference (RFI) source included in the computing device;
   a first portion that is pivotable about a second portion; and
   an orientation detection device to detect an angle between the first portion and the second portion and adjust the antenna pattern based on the angle.

2. The computing device of claim 1, comprising an additional wireless communication system, wherein the wireless communication system and the additional wireless communication system are both coupled to each of the plurality of antennas.

3. The computing device of claim 2, wherein the plurality of wireless communication systems comprise a Wifi system and a mobile telephony system.

4. The computing device of claim 1, wherein the pattern controller is to apply a gain to each of the plurality of antennas according to a specified set of pattern control parameters.

5. The computing device of claim 1, wherein the pattern controller is to adjust the antenna pattern based on a change in a relative location of the RFI source with respect to the plurality of antennas.

6. The computing device of claim 1, wherein the pattern controller comprises a first set of pattern control parameters, and at least a second set of pattern control parameters, wherein the pattern controller selects between the first set or the second set based on the angle.

7. The computing device of claim 1, wherein the computing device is a tablet PC, mobile phone, or a laptop computer.

8. A computing device, comprising:
   logic to receive a first signal from a first antenna and modify the first signal according to a first gain to generate a first modified signal;
   logic to receive a second signal from a second antenna and modify the second signal according to a second gain to generate a second modified signal;
   logic to sum the first modified signal and the second modified signal to generate a combined signal and send the combined signal to a wireless communication system; and
   logic to determine an angle between a base of the computing device and a lid of the computing device;
   wherein the first gain and the second gain are specified based, at least in part, on the angle to shape a combined antenna pattern of the first and second antennas to point a null of the combined antenna pattern toward a Radio Frequency Interference (RFI) source included in the computing device.

9. The computing device of claim 8, comprising an other wireless communication system coupled to the first antenna and the second antenna.

10. The computing device of claim 9, wherein the wireless communication system operates at a different frequency range compared to the other communication system.

11. The computing device of claim 9, comprising logic to time share the first antenna and the second antenna between the communication system and the other communication system.

12. The computing device of claim 8, comprising logic to obtain a set of pattern control parameters, wherein the pattern control parameters comprise the first gain and the second gain.

13. The computing device of claim 12, comprising logic to determine a relative location of the RFI source with respect to the plurality of antennas, wherein the logic to obtain the set of pattern control parameters is to select the set of pattern control parameters based on the relative location.

14. A computing device, comprising
   a base;
   a lid that is pivotable about the base;
   an orientation detection device to detect an angle between the base and the lid and generate a signal describing the angle; and
   an integrated circuit chip comprising:
       an antenna array comprising a plurality of antennas to couple to a plurality of communication systems;
       a pattern controller to shape an antenna pattern of the antenna array, based at least in part on the angle, to point a null of the antenna pattern toward a Radio Frequency Interference (RFI) source included in the computing device.

15. The computing device of claim 14, comprising a memory device to store a set of pattern control parameters to be received by the pattern controller.

16. The computing device of claim 14, comprising a memory device to store a plurality of sets of pattern control parameters to be received by the pattern controller, wherein the pattern controller selects a particular one of the plurality of sets of pattern control parameters based on which set of pattern control parameters results in the highest Signal to Noise and Interference Ratio (SNIR).

17. The computing device of claim 14, wherein the pattern controller comprises a first set of pattern control parameters, and a second set of pattern control parameters, and the pattern controller selects between the first set or the second set based on the signal received from the orientation detector.

\* \* \* \* \*